(12) United States Patent
Moyer

(10) Patent No.: US 6,963,963 B2
(45) Date of Patent: Nov. 8, 2005

(54) MULTIPROCESSOR SYSTEM HAVING A SHARED MAIN MEMORY ACCESSIBLE BY ALL PROCESSOR UNITS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 50 days.

(21) Appl. No.: 10/396,675

(22) Filed: Mar. 25, 2003

(65) Prior Publication Data

US 2004/0193831 A1 Sep. 30, 2004

(51) Int. Cl.[7] .............................................. G06F 12/00
(52) U.S. Cl. ....................... 711/202; 711/201; 711/202; 711/203; 711/205; 711/206; 711/207; 711/211; 714/24; 714/29; 714/30; 714/35; 714/47; 714/729; 714/730
(58) Field of Search ....................... 711/118, 125, 138, 711/163, 200–221; 714/24–47, 718, 724, 714/734, 729–730

(56) References Cited

U.S. PATENT DOCUMENTS

| | | | |
|---|---|---|---|
| 4,888,688 A | | 12/1989 | Hartvigsen |
| 5,530,804 A | * | 6/1996 | Edgington et al. ............ 714/30 |
| 5,682,310 A | | 10/1997 | Pedneau |
| 5,900,014 A | * | 5/1999 | Bennett ....................... 711/138 |
| 6,446,221 B1 | * | 9/2002 | Jaggar et al. .................. 714/30 |
| 6,499,123 B1 | * | 12/2002 | McFarland et al. ......... 714/724 |
| 6,748,558 B1 | * | 6/2004 | Gonzales et al. ............. 714/47 |
| 2004/0019827 A1 | * | 1/2004 | Rohfleisch et al. ........... 714/29 |

OTHER PUBLICATIONS

MacNamee et al., Dec., 2000, Computing & Control Engineering Journal, vol. 11, pp. 295-303.*
"PCI Arbiter Core," Actel Corporation, Jan. 2002, pp. 1-3.
Section 3, Memory Management Unit (MC68040 and MC68LC040); MC68040, MC68EC040, MC68LC040 Microprocessors User's Manual, Third Edition, Motorola, 1992, pp. 3-1 to 3-34.
Section 5, Signal Description; MC68040, MC68EC040, MC68LC040 Microprocessor User's Manual, Third Edition, Motorola, 1992, pp. 5-1 to 5-17.
Section 5, Signal Description, Enhanced 32-Bit, MC68030 Microprocessor User's Manual, Third Edition, Motorola, 1990, pp. 5-1 to 5-12.
Section 9, Memory Management Unit, Enhanced 32-Bit, MC68030 Microprocessor User's Manual, Third Edition, Motorola, 1990, pp. 9-1 to 9-86.
Section 12, Applications Information, Enhanced 32-Bit, MC68030 Microprocessor User's Manual, Third Edition, Motorola, 1990, pp. 12-1 to 12-46.

* cited by examiner

Primary Examiner—Donald Sparks
Assistant Examiner—Hashem Farrokh
(74) Attorney, Agent, or Firm—Susan C. Hill; Joanna G. Chiu

(57) ABSTRACT

A data processing (10) includes memory management circuitry (14) which allows additional control over the physical address (83) and over the address attributes (84) which are provided for use by data processing system (10). One use of this additional control over the physical address (83) and over the address attributes (84) is to avoid address translation failure and unintended modification of cache (13) and memory (18) system state during debugging.

38 Claims, 5 Drawing Sheets

FIG. 3

| BIT(S) | NAME | DESCRIPTION OF FUNCTION |
|---|---|---|
| 0:19 | DM_PAGE_BASE | DEBUG MEMORY MANAGEMENT CIRCUITRY 14 PAGE BASE<br>DEFINES THE PHYSICAL PAGE BASE TO BE USED DURING ADDRESS TRANSLATION WHEN THE DM_MAP CONTROL BIT IS ASSERTED |
| 20 | — | RESERVED |
| 21 | DM_MAP | DEBUG MEMORY MANAGEMENT CIRCUITRY 14 MAP CONTROL BIT (DM_MAP)<br>0 – ALTERNATE TRANSLATION NOT USED FOR DEBUG SESSIONS<br>1 – ALTERNATE TRANSLATION USED FOR DEBUG SESSIONS<br>THIS BIT MAY BE USED TO CONTROL WHETHER THE MEMORY MANAGEMENT CIRCUITRY 14 IS ENABLED NORMALLY, OR WHETHER AN ALTERNATE VIRTUAL TO PHYSICAL MAPPING (DEFINED BY THE DM_PAGE_BASE VALUE) IS TO BE USED DURING A DEBUG SESSION. WHEN DM_MAP IS NEGATED, NO ALTERNATE TRANSLATION IS USED. WHEN DM_MAP IS ASSERTED, ADDRESS TRANSLATION IS PERFORMED USING THE DM_PAGE_BASE VALUE, AND THE TLB WIMGE BITS ARE TAKEN FROM THE OCR BITS DW, DI, DM, DG, AND DE BITS. THE SX, SR, SW, UX, UR, AND UW ACCESS PERMISSION CONTROL BITS ARE SET TO '1' TO ALLOW FULL ACCESS. WHEN ALTERNATE MAPPING IS ENABLED, NO TLB MISS OR TLB EXCEPTIONS ARE GENERATED. EXTERNAL ACCESS ERRORS CAN STILL OCCUR. |
| 22 | DMDIS | DEBUG MEMORY MANAGEMENT CIRCUITRY 14 DISABLE CONTROL BIT (DMDIS)<br>0 – MEMORY MANAGEMENT CIRCUITRY 14 NOT DISABLED FOR DEBUG SESSIONS<br>1 – MEMORY MANAGEMENT CIRCUITRY 14 DISABLED FOR DEBUG SESSIONS<br>THIS BIT MAY BE USED TO CONTROL WHETHER THE MEMORY MANAGEMENT CIRCUITRY 14 IS ENABLED NORMALLY, OR WHETHER THE MEMORY MANAGEMENT CIRCUITRY 14 IS DISABLED DURING A DEBUG SESSION. WHEN ENABLED, THE MEMORY MANAGEMENT CIRCUITRY 14 FUNCTIONS NORMALLY. WHEN DISABLED, NO ADDRESS TRANSLATION IS PERFORMED (1:1 ADDRESS MAPPING), AND THE TLB WIMGE BITS ARE TAKEN FROM THE OCR BITS DW, DI, DM, DG, AND DE BITS. THE SX, SR, SW, UX, UR, AND UW ACCESS PERMISSION CONTROL BITS ARE SET TO '1' TO ALLOW FULL ACCESS. WHEN DISABLED, NO TLB MISS OR TLB EXCEPTIONS ARE GENERATED. EXTERNAL ACCESS ERRORS CAN STILL OCCUR. |
| 23 | — | RESERVED |

| BIT(S) | NAME | DESCRIPTION OF FUNCTION |
|---|---|---|
| 24 | DW | DEBUG TLB 'W' ATTRIBUTE BIT (DW)<br>THIS BIT IS USED TO PROVIDE THE 'W' ATTRIBUTE BIT TO BE USED WHEN THE MEMORY MANAGEMENT CIRCUITRY 14 IS DISABLED OR ALTERNATE MAPPING IS USED DURING A DEBUG SESSION. — 55 |
| 25 | DI | DEBUG TLB 'I' ATTRIBUTE BIT (DI)<br>THIS BIT IS USED TO PROVIDE THE 'I' ATTRIBUTE BIT TO BE USED WHEN THE MEMORY MANAGEMENT CIRCUITRY 14 IS DISABLED OR ALTERNATE MAPPING IS USED DURING A DEBUG SESSION. — 56 |
| 26 | DM | DEBUG TLB 'M' ATTRIBUTE BIT (DM)<br>THIS BIT IS USED TO PROVIDE THE 'M' ATTRIBUTE BIT TO BE USED WHEN THE MEMORY MANAGEMENT CIRCUITRY 14 IS DISABLED OR ALTERNATE MAPPING IS USED DURING A DEBUG SESSION. — 57 |
| 27 | DG | DEBUG TLB 'G' ATTRIBUTE BIT (DG)<br>THIS BIT IS USED TO PROVIDE THE 'G' ATTRIBUTE BIT TO BE USED WHEN THE MEMORY MANAGEMENT CIRCUITRY 14 IS DISABLED OR ALTERNATE MAPPING IS USED DURING A DEBUG SESSION. — 58 |
| 28 | DE | DEBUG TLB 'E' ATTRIBUTE BIT (DE)<br>THIS BIT IS USED TO PROVIDE THE 'E' ATTRIBUTE BIT TO BE USED WHEN THE MEMORY MANAGEMENT CIRCUITRY 14 IS DISABLED OR ALTERNATE MAPPING IS USED DURING A DEBUG SESSION. — 59 |
| 29 | — | RESERVED |
| 30 | — | RESERVED |
| 31 | DR | PROCESSOR 12 DEBUG REQUEST CONTROL BIT<br>THIS CONTROL BIT IS USED TO UNCONDITIONALLY REQUEST THE PROCESSOR 12 TO ENTER THE DEBUG MODE. THE PROCESSOR 12 WILL INDICATE THAT DEBUG MODE HAS BEEN ENTERED VIA THE DATA SCANNED OUT IN THE SHIFT-IR STATE.<br>0 - NO DEBUG MODE REQUEST<br>1 - UNCONDITIONAL DEBUG MODE REQUEST<br>WHEN THE DR BIT IS SET OR REMAINS SET, THE PROCESSOR RETURNS TO DEBUG MODE AFTER EXECUTION OF A SINGLE INSTRUCTION, EVEN WITH A WRITE TO THE OCMD WITH GO AND EX SET. THIS BIT IS CLEARED ON THE TEST LOGIC RESET. — 60 |

*FIG. 4*

MULTIPROCESSOR SYSTEM HAVING A SHARED MAIN MEMORY ACCESSIBLE BY ALL PROCESSOR UNITS

FIELD OF THE INVENTION

The invention relates generally to a data processing system, and more particularly, to memory management in a data processing system.

RELATED ART

Many data processing systems support a hardware debug mode in which normal operation is suspended and a debug mode is entered. Debug operations are performed by supplying instructions from debug circuitry to a processor for execution, after which the processor returns to the debug mode and awaits a further command. The debug circuitry controls stepping of the processor until the debug session completes, and the processor is released to resume normal execution. During the debug session, instructions are generally not fetched from memory, but are instead provided from the debug circuitry, typically though a scan-based interface such as a JTAG (Joint Test Action Group) serial interface.

Stepped instructions are used to examine the state of processor registers (e.g. by executing move instructions, capturing the results of the instructions, and providing the results to the debug circuitry) and to examine system state such as memory (e.g. by executing load instructions, capturing the results of the instructions, and providing the results to the debug circuitry). Resources in the data processing system may also be modified through the use of move and store instructions.

During the debug process, it is desirable to minimize or eliminate the extraneous alteration of system state in order to be as unobtrusive to normal operation as possible.

BRIEF DESCRIPTION OF THE DRAWINGS

The present invention is illustrated by way of example and not limited by the accompanying figures, in which like references indicate similar elements, and in which:

FIG. 3 illustrates, in tabular form, functionality of a portion of control register 17 of FIG. 2 in accordance with one embodiment of the present invention;

FIG. 4 illustrates, in tabular form, functionality of a portion of control register 17 of FIG. 2 in accordance with one embodiment of the present invention;

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

During the debug process, it is desirable to minimize or eliminate the extraneous alteration of system state in order to be as unobtrusive to normal operation as possible. However, a problem occurs when debugging a processor containing a cache memory or a memory management unit. In these systems, control over the caching policies and over the address translation process must occur during the debug sessions in order to avoid address translation failures and in order to avoid unintended modification of cache and memory system state. By providing the debugger with a way to control physical address generation and access attribute information, the present invention overcomes the limitations of some prior art systems in which a debugger has limited or no control over these functions. The present invention also overcomes the limitation of other prior art systems which must execute an extensive set of operations in order to reconfigure the memory management unit and cache system in order to properly function during debug operation. Such prior art systems also require a subsequent extensive restore operation, which may not even be possible.

Figure 1:
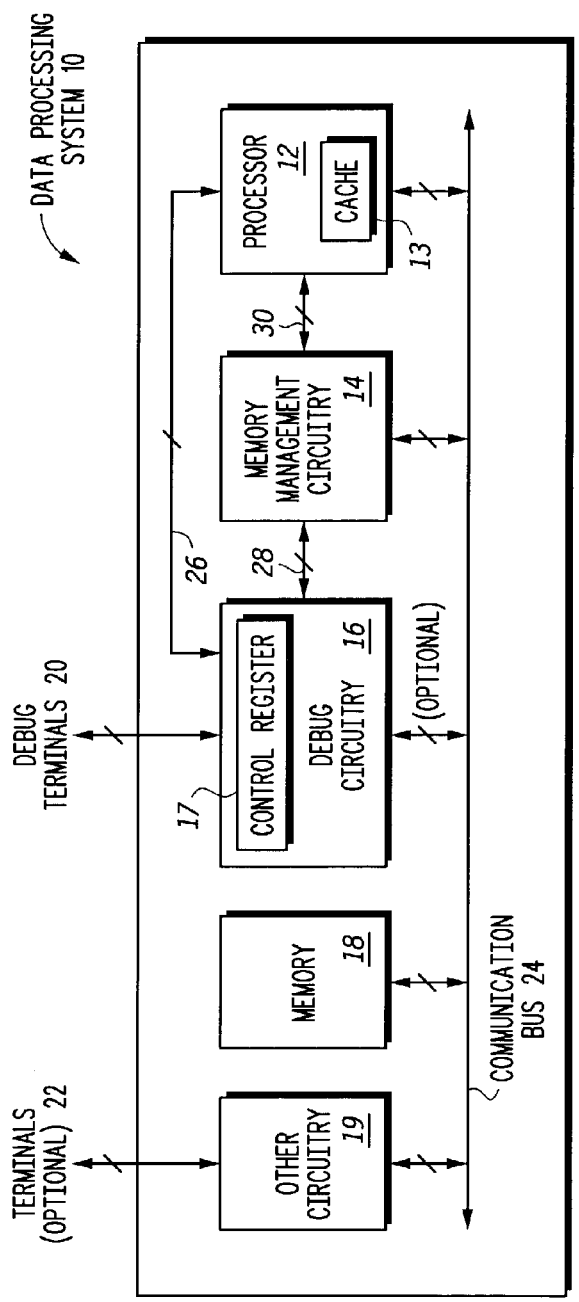
FIG. 1 illustrates, in block diagram form, a data processing system 10 in accordance with one embodiment of the present invention.

FIG. 1 illustrates a data processing system 10 in accordance with one embodiment of the present invention. In the illustrated embodiment, data processing 10 includes at least one processor 12, memory management circuitry 14, debug circuitry 16, memory 18, and other circuitry 19, which are all bi-directionally coupled to a communication bus 24. In alternate embodiments, debug circuitry 16 may not be coupled to communication bus 24. Processor 12 may optionally include one or more caches such as cache 13. In alternate embodiments of the present invention, data processing system 10 may be implemented on a single integrated circuit or on a plurality of integrated circuits. In alternate embodiments, memory 18 may be any type of memory and may be located on a same integrated circuit as processor 12, or on a different integrated circuit than processor 12. Other circuitry 19 is optional and is circuitry that performs any desired function. As an example, other circuitry 19 may include circuitry to perform one or more of the following functions: timer function, data processing function, communication function, input/output function, memory function, analog to digital conversion, display driver function, external bus interface function, etc. Other circuitry 19 may optionally be coupled to terminals 22 in order to communicate external to data processing system 10.

Note that memory management circuitry 14 may be implemented in a wide variety of ways. In one embodiment of the present invention, memory management circuitry 14 is a memory management unit (MMU) which provides address translation from a virtual address to a physical address, as well as providing address attributes. In alternate embodiments of the present invention, memory management circuitry 14 provides address attributes as well as boundary registers which store upper and lower boundary addresses. In yet other embodiments of the present invention, memory management circuitry 14 provides address attributes without performing any address translation or address boundary checking. In some embodiments of the present invention, the address attributes may be stored outside of memory management circuitry 14 in another portion of data processing system 10.

In one embodiment of the present invention, Debug circuitry 16 includes control register 17. In some embodiments of the present invention, debug circuitry 16 is coupled to debug terminals 20 in order to communicate external to data processing system 10. Debug terminals 20 may be used to provide debug control information to data processing system 10, and may also be used to provide result information regarding debug operations from data processing system 10 to external monitoring circuitry (not shown) which is located external to data processing system 10. In some embodiments of the present invention, debug circuitry 16 is bi-directionally coupled to memory management circuitry 14 by way of signals 28. In some embodiments, debug circuitry 16 provides control information (e.g. at least a portion of control register 17) to memory management circuitry 14 by way of signals 28. In some embodiments of the present invention, debug circuitry 16 is bi-directionally coupled to processor 12 by way of signals 26. In some embodiments of the present invention, memory management circuitry 14 is bi-directionally coupled to processor 12 by way of signals 30. In some embodiments of the present invention, debug circuitry 16 and its interaction with other portions of data processing system 10 is compliant with one or more existing standards, such as JTAG or the NEXUS 5001™ standard.

Figure 2:
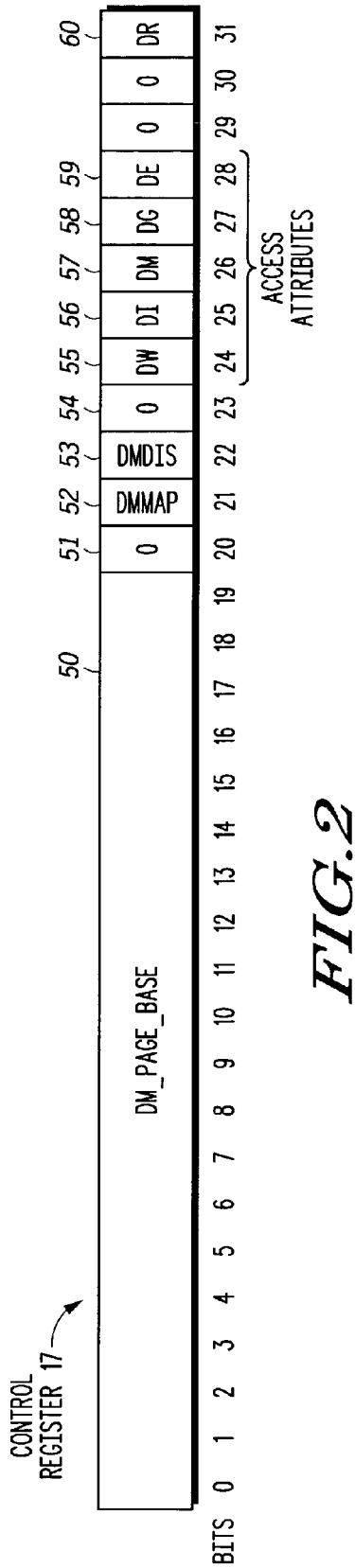
FIG. 2 illustrates, in block diagram form, a control register 17 of FIG. 1 in accordance with one embodiment of the present invention.

FIG. 2 illustrates a control register 17 of FIG. 1 in accordance with one embodiment of the present invention. Although FIG. 2 illustrates a specific embodiment of the present invention which uses specific bit fields, alternate embodiments of the present invention may use different bit fields having different numbers of bits in each field. The specific bits illustrated in FIG. 2 are shown only for illustrative purposes.

The functionality of the specific embodiment of control register 17 illustrated in FIG. 2 is further described in FIGS. 3 and 4. Again, note that different bit fields having different names and different numbers of bits may be used in various embodiments of control register 17. In one embodiment of the present invention, control register 17 is a writeable register that may also be readable and which is part of the user's programming model. In alternate embodiments of the present invention, control register 17 may not be a control register in the user's programming model, but instead may be implemented outside of the user's programming model. Any type of storage circuitry may be used to implement control register 17.

The specific embodiment of the present invention illustrated in FIGS. 2–4 includes alternate physical address DM_PAGE_BASE 50, which is located at bit locations 0–19. In alternate embodiments of the present invention, the alternate physical address may be any number of bits in length and may be designated by any name. The specific embodiment of the present invention illustrated in FIGS. 2–4 includes indicators DM_MAP 52 and DMDIS 53, which are located at bit locations 21 and 22 respectively. In alternate embodiments of the present invention, each indicator may be any number of bits in length, may perform any desired indicator function, and may be designated by any name.

The specific embodiment of the present invention illustrated in FIGS. 2–4 includes address access attributes DW 55, DI 56, DM 57, DG 58, and DE 59, which are located at bit locations 24, 25, 26, 27, and 28, respectively. In alternate embodiments of the present invention, each address access attribute may be any number of bits in length, may perform any desired address access function, and may be designated by any name. The specific embodiment of the present invention illustrated in FIGS. 2–4 includes a control bit DR 60 which is used to unconditionally request that processor 12 enter a debug mode. Alternate embodiments of the present invention may not use this control bit and may instead cause processor 12 to enter a debug mode in a different manner. The specific embodiment of the present invention illustrated in FIGS. 2–4 includes several bit locations, namely bit locations 20, 23, 29, and 30, which are reserved for future use or for other uses that are not related to the present invention. In some embodiments of the present invention, these reserved bits may come out of reset to a predetermined value, which in some embodiments may be a binary "0", and in other embodiments may be a binary "1".

Still referring to FIGS. 3–4, the "W" attribute bit determines write through control for cache 13. The "I" attribute bit determines cache inhibit control for cache 13. The "M" attribute bit determines memory coherency control for cache 13. The "G" attribute bit determines guarded memory region control for cache 13. The "E" attribute bit determines Endian control (i.e. location of most significant byte) for cache 13. Alternate embodiments of the present invention may use more, fewer, or different attributes as part of access attributes 55–59.

Figure 5:
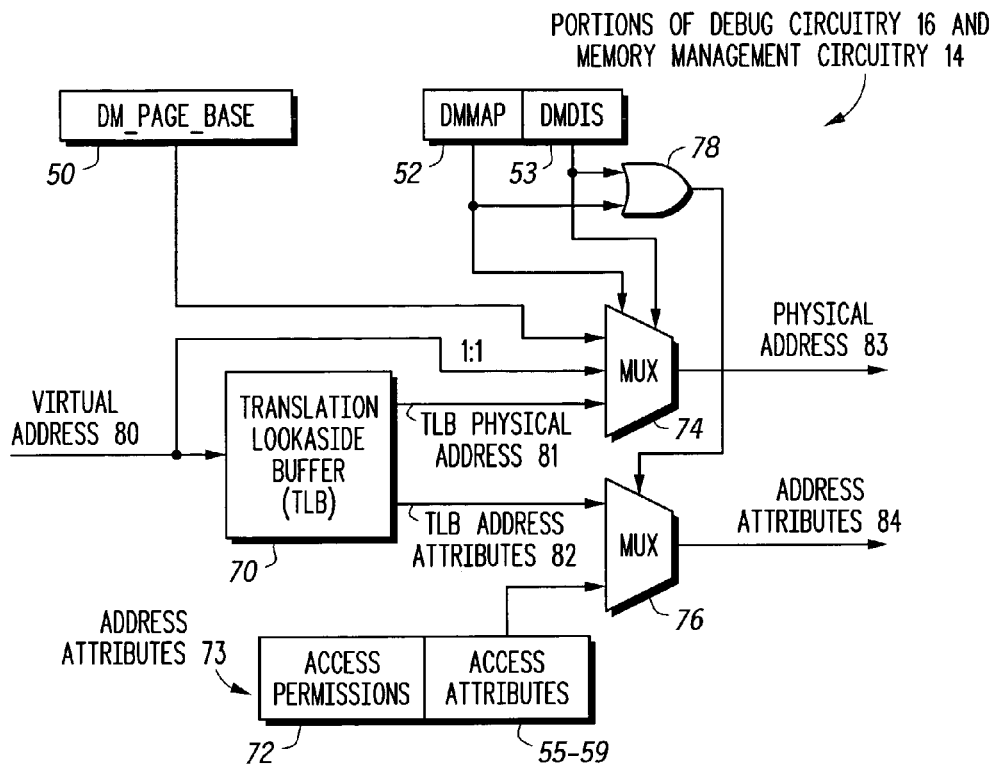
FIG. 5 illustrates, in partial block diagram form and partial schematic diagram form, portions of debug circuitry 16 and memory management circuitry 14 of FIG. 1 in accordance with one embodiment of the present invention.

FIG. 5 illustrates portions of debug circuitry 16 and memory management circuitry 14 of FIG. 1 in accordance with one embodiment of the present invention. Note that FIG. 5 illustrates only one possible circuit for implementing the functionality of the bits of control register 17 as described in FIG. 3–4. Alternate embodiments of the present invention may use various circuits to implement the functionality of the bits of control register 17 as described in FIG. 3–4. Yet other embodiments of the present invention may use different bits in control register 17 to implement the present invention. Also, some embodiments of the present invention may not even require the use of a control register 17 to store the necessary control information. The user determined control information may be provided from external to data processing system 10 by way of terminals, or may be stored within data processing system 10 in a storage circuit which is not a register in the user's programming model.

The circuitry illustrated in FIG. 5 includes a translation lookaside buffer (TLB) 70 which receives a virtual address 80 and provides a corresponding TLB physical address 81 as an output. Multiplexer (MUX) 74 is used to determine the source of physical address 83. If the DM_MAP bit 52 is asserted, then MUX 74 provides the DM_PAGE_BASE bits 50 as the physical address 83. If the DMDIS bit 53 is asserted, then MUX 74 provides the virtual address 80 as the physical address 83 (thus providing a 1:1 mapping between the virtual address 80 and the physical address 83). If the DM_MAP bit 52 is negated and the DMDIS bit 53 is negated, then MUX 74 provides the TLB physical address 81 as the physical address 83. Any type of storage circuitry may be used to implement TLB 70 and address attributes 73. A selecting function (e.g. selecting which physical address to provide as physical address 83 and which address attributes to provide as address attributes 84) may be performed by circuitry 74, 76, and 78, or alternately may be implemented using any type of circuitry.

Multiplexer (MUX) 76 is used to determine the source of address attributes 84. If the DM_MAP bit 52 is asserted or the DMDIS bit 53 is asserted, then MUX 76 provides the address attributes 73 as the address attributes 84. Address attributes 73 include access permissions 72 and access attributes 55–59. Access permissions are address attributes that relate to whether a particular function (e.g. a write operation) is permitted. Access attributes relate to other characteristics or attributes that can be selected for that particular address. If neither the DM_MAP bit 52 nor the DMDIS bit 53 is asserted, then MUX 76 provides the TLB address attributes 82 as the address attributes 84. In some embodiments of the present invention, TLB address attributes 82 include an access permissions portion and an access attributes portion. In alternate embodiments of the present invention, TLB address attributes 82 may include only an access permission portion or only an access attributes portion. Note that the TLB physical address 81 and the TLB address attributes 82 were selected by virtual address 80. In one embodiment of the present invention, TLB 70 operates in a standard prior art manner.

Referring to FIG. 5, the DM_MAP bit 52 is used to selectively provide one or more substitute address attributes 73 to replace or override the corresponding normal TLB address attributes 82 provided by TLB 70. In some embodiments of the present invention, the TLB address attributes 82 include an access permissions portion and an access attributes portion, and the alternate address attributes 73 include access permissions 72 and access attributes 55–59. In one embodiment of the present invention, the access attributes portion of the TLB address attributes 82 is selectively overridden or replaced by the value of access attributes 55–59, while the access permissions portion of the TLB address attributes 82 is selectively overridden or replaced by the value of access permissions 72. In one embodiment of the present invention, access attributes 55–59 are user programmable while access permissions 72 are a predetermined value that is not user programmable. Alternate embodiments of the present invention may make all, none, or different portions of address attributes 73 user programmable.

Note that in addition to access attributes 55–59, data processing system 10 also uses access permissions Supervisor Execute (SX), Supervisor Read (SR), Supervisor Write (SW), User Execute (UX), User Read (UR) and User Write (UW) in some embodiments of the present invention. In one embodiment, these access permissions are forced to predetermined states that allow full access (regardless of read/write or supervisor/user status) when the DMDIS bit 53 is asserted in order to disable the memory management circuitry 14. In one embodiment of the present invention, the address attributes 84 include both the access permissions described above, as well as the access attributes 55–59 described in FIG. 2–4.

Figure 6:
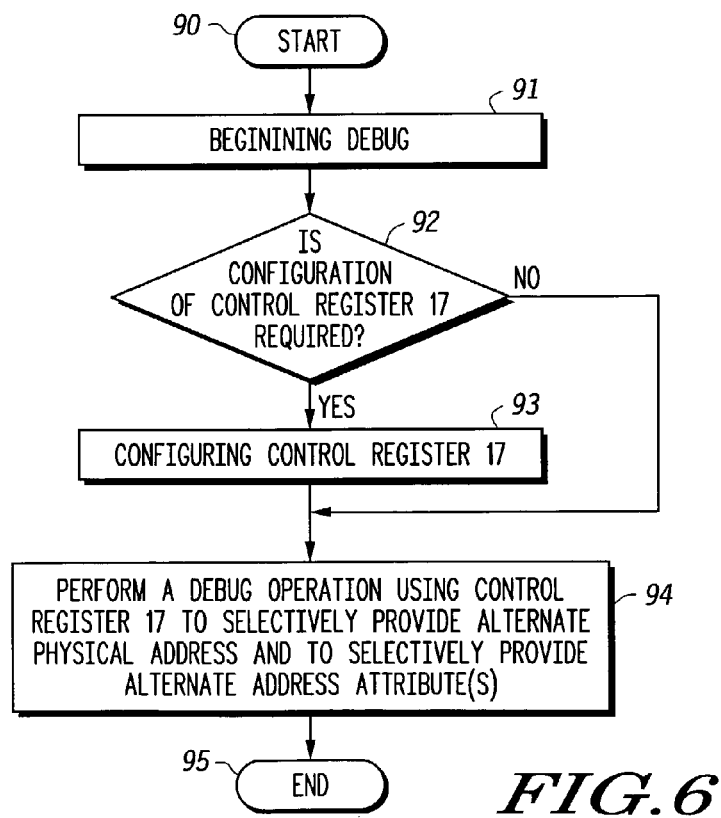
FIG. 6 illustrates, in flow diagram form, a method for performing memory management in accordance with one embodiment of the present invention.

FIG. 6 illustrates, in flow diagram form, a method for performing memory management in accordance with one embodiment of the present invention. The flow of FIG. 6 starts at oval 90 and then continues to step 91 where debug is begun. From step 91, the flow continues to decision diamond 92 where the question is asked "is configuration of control register 17 required?". If the answer is yes, the flow continues to step 93 where control register 17 is configured; the flow then continues to step 94. If the answer at decision diamond 92 is no, the flow continues to step 94 where a debug operation is performed using control register 17 to selectively provide an alternate physical address and to selectively provide alternate address attribute(s). The flow then continues to oval 95 where the flow ends.

Figure 7:
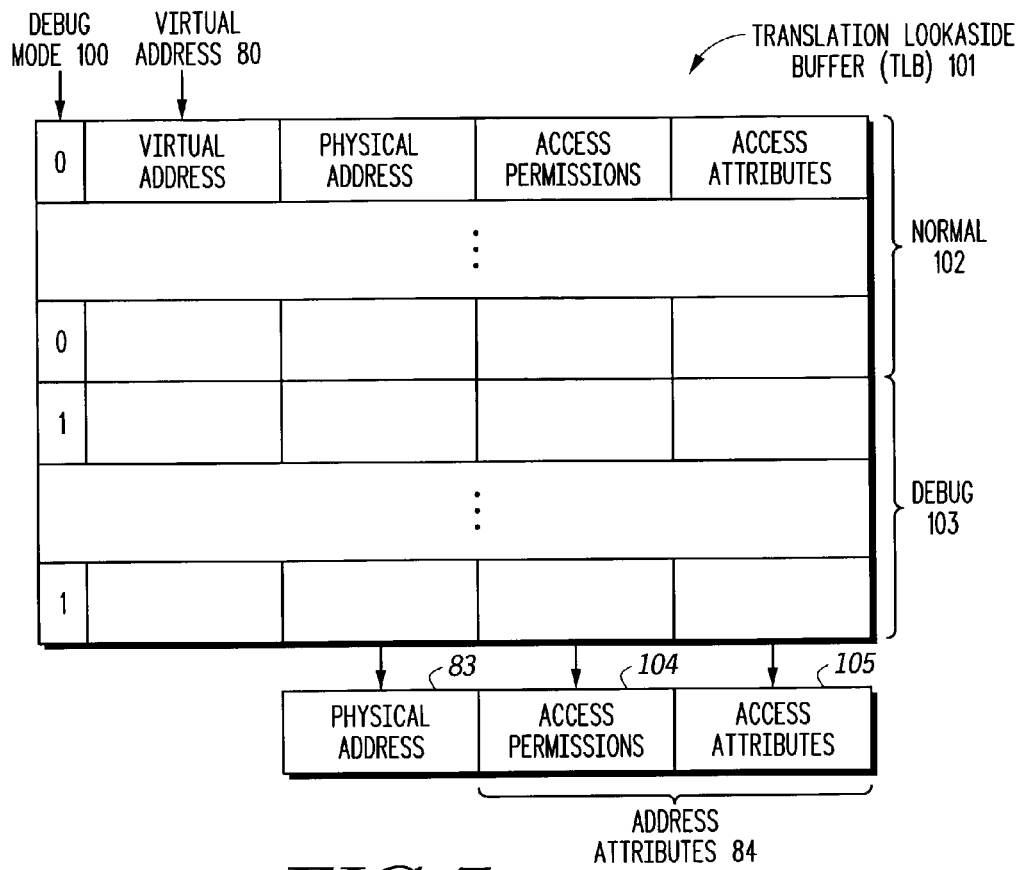
FIG. 7 illustrates, in block diagram form, a translation lookaside buffer 101 in accordance with an alternate embodiment of the present invention.

FIG. 7 illustrates, in block diagram form, a translation lookaside buffer 101 in accordance with an alternate embodiment of the present invention. In this embodiment, translation lookaside buffer (TLB) 101 includes an additional bit for each entry (collectively bits 109) which are compared to debug mode indicator 100. Debug mode indicator 100 may function as an alternate address indicator or as an override control indicator. In one embodiment of the present invention, if debug mode indicator 100 is 0, the normal portion 102 of TLB 101 is used to provide physical address 83 and address attributes 84; and if debug mode indicator 100 is 1, the debug portion 103 of TLB 101 is used to provide physical address 83 and address attributes 84. Alternate embodiments of the present invention may encode this functionality into TLB 101 in any desired manner. Note that in one embodiment of the present invention, address attributes 84 include both access permissions 104 and access attributes 105. In alternate embodiments of the present invention, address attributes may include only access permission 104 or only access attributes 105. Any type of storage circuitry may be used to implement TLB 101, physical address 83, and address attributes 84.

Figure 8:
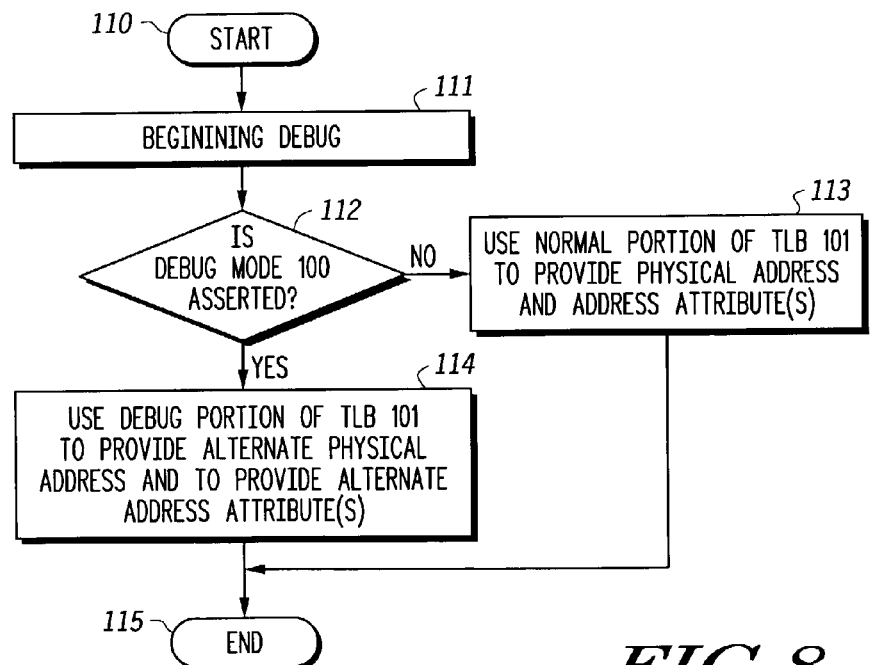
FIG. 8 illustrates, in flow diagram form, a method for performing memory management in accordance with an alternate embodiment of the present invention.

FIG. 8 illustrates, in flow diagram form, a method for performing memory management in accordance with the alternate embodiment of the present invention illustrated in FIG. 7. The flow of FIG. 8 starts at oval 110 and then continues to step 111 where debug is begun. From step 111, the flow continues to decision diamond 112 where the question is asked "is debug mode 100 asserted?". If the answer is yes, the flow continues to step 114 where a debug portion of TLB 101 is used to provide an alternate physical address and to provide alternate address attribute(s); the flow then continues to oval 115. If the answer at decision diamond 112 is no, the flow continues to step 113 where a normal portion of TLB 101 is used to provide a physical address and address attribute(s); the flow then continues to oval 115. At oval 115, the flow ends.

In the present invention, memory management circuitry 16 may selectively provide at least one alternate address attribute as the corresponding address attribute to be used by data processing system 10, based at least in part on an override control indicator. This override control indicator could be a single bit (e.g. 52 or 53), a combination of bits (e.g. 52 and 53) combined in any manner, or a signal such as debug mode 100. Alternate embodiments of the present invention may implement the functionality of the override control indicator in any desired manner.

In one embodiment of the present invention, DM_MAP 52 (see FIG. 3) may function as an alternate address indicator. In alternate embodiments of the present invention, a combination of bits (e.g. 52 and 53) combined in any manner (such as, for example, combined by logic gate 78 in FIG. 5) may function as an alternate address indicator. In yet other embodiments of the present invention, any appropriate signal, such as, for example, debug mode 100, may function as an alternate address indicator. Alternate embodiments of the present invention may implement the functionality of the alternate address indicator in any desired manner.

In one embodiment of the present invention, DMDIS 53 (see FIG. 3) may function as an address translation indicator. In alternate embodiments of the present invention, memory management circuitry 14 without a translation lookaside buffer 70 may function as an address translation indicator. In yet other embodiments of the present invention, a combination of bits (e.g. 52 and 53) combined in any manner (such as, for example, combined by logic gate 78 in FIG. 5) may function as an address translation indicator. Alternate embodiments of the present invention may implement the functionality of the address translation indicator in any desired manner.

Note that the functionality described hereinabove may be implemented in any manner. For example, the functionality described in FIGS. 2–8 may be implemented using circuitry distributed in any manner, and located anywhere in data processing system 10.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

For example, although the selective substitution of one or more alternate address attributes for the one or more normal address attributes have been described in the context of debug, alternate embodiments of the present invention may perform this selective substitution in other contexts and for other reasons.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system, comprising:
   first storage circuitry which stores at least one alternate address attribute;
   second storage circuitry which stores at least one normal address attribute; and
   memory management circuitry which receives a received virtual address and at least one received address attribute and which provides, in response, a physical address and at least one corresponding address attribute, wherein the memory management circuitry selects between the at least one received address attribute, the at least one alternate address attribute, and the at least one normal address attribute to provide as the at least one corresponding address attribute.

2. The data processing system of claim 1, wherein the memory management circuitry selectively provides the at least one alternate address attribute as the first corresponding address attribute based at least in part on an override control indicator.

3. The data processing system of claim 2, further comprising third storage circuitry which stores an alternate physical address and fourth storage circuitry which stores a normal physical address, wherein the memory management circuitry selectively provides the alternate physical address in place of the normal physical address as the physical address.

4. The data processing system of claim 3, wherein the memory management circuitry selectively provides the alternate physical address in place of the normal physical address based at least in part on an alternate address indicator.

5. The data processing system of claim 4, wherein the memory management circuitry selectively provides the received virtual address as the physical address based at least in part on an address translation indicator.

6. The data processing system of claim 5, further comprising fifth storage circuitry which stores the override control indicator, the alternate address indicator, and the address translation indicator.

7. The data processing system of claim 6, wherein the override control indicator comprises the alternate address indicator and the address translation indication.

8. The data processing system of claim 3, wherein the memory management circuitry further comprises a translation lookaside buffer (TLB), wherein the TLB comprises the third storage circuitry which stores the alternate physical address and the fourth storage circuitry which stores the normal physical address.

9. The data processing system of claim 2, wherein the memory management circuitry selectively provides the received virtual address as the physical address based at least in part on an address translation indicator.

10. The data processing system of claim 1, wherein the first storage circuitry stores a plurality of alternate address attributes, the second storage circuitry stores a plurality of normal address attributes, and the memory management circuitry provides the physical address and a plurality of corresponding address attributes, and wherein the memory management circuitry selectively provides the plurality of alternate address attributes in place of the plurality of normal address attributes as the plurality of corresponding address attributes.

11. The data processing system of claim 10, wherein each of the plurality of alternate address attributes and each of the plurality of normal address attributes are characterized as one of an access attribute or an access permission corresponding to the physical address.

12. The data processing system of claim 1, further comprising:
   debug circuitry, coupled to the memory management circuitry, wherein the debug circuitry comprises the first storage circuitry.

13. The data processing system of claim 12, wherein the debug circuitry is NEXUS compliant.

14. The data processing system of claim 1, wherein the at least one alternate address attribute and the at least one normal address attribute is characterized as one of an access attribute or an access permission corresponding to the physical address.

15. A data processing system, comprising:
   first storage circuitry which stores an alternate physical address;
   second storage circuitry which stores a normal physical address; and
   memory management circuitry which receives a virtual address, and in response to receiving the virtual address, said memory management circuitry provides a corresponding physical address that is equal to any one of the virtual address, the alternate physical address, and the normal physical address.

16. The data processing system of claim 15, wherein the memory management circuitry selectively provides the alternate physical address as the corresponding physical address based at least in part on an alternate address indicator.

17. The data processing system of claim 16, wherein the memory management circuitry comprises a translation lookaside buffer (TLB) comprising the second storage circuitry which stores the normal physical address.

18. The data processing system of claim 17, wherein the TLB comprises the first storage circuitry which stores the alternate physical address.

19. The data processing system of claim 18, wherein the TLB stores at least one alternate address attribute corresponding to the alternate physical address and wherein the memory management circuitry provides the at least one corresponding alternate address attribute when the alternate physical address is provided.

20. The data processing system of claim 17, further comprising third storage circuitry which stores at least one alternate address attribute, and wherein the TLB stores at least one normal address attribute corresponding to the normal physical address, and wherein the memory management circuitry selectively provides the at least one alternate address attribute in place of the at least one normal address attribute, based at least in part on an override control indicator.

21. The data processing system of claim 20, wherein the override control indicator includes the alternate address indicator.

22. A method for performing memory management in a data processing system having memory management circuitry, comprising:
    selectively configuring the memory management circuitry, wherein the memory management control circuitry stores at least one alternate physical address and at least one normal physical address;
    receiving a virtual address; and
    in response to receiving the virtual address, providing a corresponding physical address, wherein the alternate physical address is selectively provided in place of the normal physical address as the corresponding physical address, wherein neither the alternate physical address nor the normal physical address is required to be identical to the virtual address.

23. The method of claim 22, further comprising:
    receiving an alternate address indicator, wherein the alternate physical address is selectively provided as the corresponding physical address based at least in part on the alternate address indicator.

24. The method of claim 23, wherein the memory management circuitry includes a translation lookaside buffer (TLB) which stores the normal physical address in a first portion of the TLB and which stores the alternate physical address in a second portion of the TLB, and wherein one of the first or second portion of the TLB is accessed to provide the corresponding physical address based on the alternate address indicator.

25. The method of claim 23, wherein selectively configuring the memory management circuitry comprises selectively updating the alternate physical address.

26. The method of claim 22, wherein the providing the corresponding physical address in response to receiving the virtual address is performed during a debug operation.

27. A data processing system, comprising:
    first storage circuitry which stores an alternate physical address;
    second storage circuitry which stores at least one alternate address attribute;
    third storage circuitry which stores a normal physical address;
    fourth storage circuitry which stores at least one normal address attribute;
    debug circuitry, wherein the debug circuitry performs NEXUS compliant debug operations; and
    memory management circuitry, coupled to the debug circuitry, the first storage circuitry, the second storage circuitry, the third storage circuitry, and the fourth storage circuitry, wherein the memory management circuitry, in response to receiving a virtual address during a NEXUS compliant debug operation, selectively provides the alternate physical address in place of the normal physical address as a corresponding physical address based at least in part on an alternate address indicator and selectively provides the at least one alternate address attribute in place of the at least one normal address attribute as a corresponding address attribute based at least in part on an override control indicator, wherein the override control indicator is based at least in part on the alternate address indicator.

28. The data processing system of claim 27, wherein the memory management circuitry further comprises a translation lookaside buffer (TLB), wherein the TLB comprises the third storage circuitry which stores the normal physical address and the fourth storage circuitry which stores the at least one normal address attribute.

29. The data processing system of claim 28, wherein a first portion of the TLB comprises the third storage circuitry which stores the normal physical address and the fourth storage circuitry which stores the at least one normal address attribute, and a second portion of the TLB comprises the first storage circuitry which stores the alternate physical address and the second storage circuitry which stores the at least one alternate address attribute.

30. The data processing system of claim 29, wherein the alternate address indicator and the override control indicator are a same indicator.

31. The data processing system of claim 28, wherein the debug circuitry comprises the first storage circuitry and the second storage circuitry.

32. The data processing system of claim 27, wherein the memory management circuitry selectively provides the virtual address in place of the normal physical address as the corresponding physical address based at least in part on an address translation indicator.

33. The data processing system of claim 32, wherein the override control indicator is based at least in part on the alternate address indicator and the address translation indicator.

34. The data processing system of claim 33, wherein each of the alternate address indicator and the address translation indicator are stored within a control register within the debug circuitry.

35. A method for performing memory management in a data processing system having a translation buffer, comprising:

receiving a virtual address;

if a predetermined mode is selected, selectively using the virtual address and a first portion of a translation buffer to perform address translation of the virtual address, and providing a first physical address from the first portion of the translation buffer; and if the predetermined mode is not selected, selectively using the virtual address and a second portion of the translation buffer to perform address translation of the virtual address, and providing a second physical address from the second portion of the translation buffer, wherein the first and second portions of the translation buffer are different portions of the translation buffer.

36. A method as in claim 35, further comprising:

selectively bypassing the translation buffer so that no address translation is performed; and providing the virtual address as the physical address.

37. A method as in claim 36, wherein the predetermined mode is a debug mode.

38. A method as in claim 37, wherein the first portion of the translation buffer is only used to perform address translation when the data processing system is in the debug mode.

* * * * *

UNITED STATES PATENT AND TRADEMARK OFFICE
CERTIFICATE OF CORRECTION

PATENT NO.        : 6,963,963 B2                                              Page 1 of 1
APPLICATION NO.   : 10/396675
DATED             : March 25, 2003
INVENTOR(S)       : William C. Moyer It is certified that error appears in the above-identified patent and that said Letters Patent is hereby corrected as shown below:

On the Title Page Item 54 and Col 1, Lines 1-3, the Patent Title:

Change "MULTIPROCESSOR SYSTEM HAVING A SHARED MAIN MEMORY ACCESSIBLE BY ALL PROCESSOR UNITS" to --MEMORY MANAGEMENT IN A DATA PROCESSING SYSTEM--

In Column 12, Line 5, Claim No. 37:

Change "36" to --35--

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,963,963 B2 | Page 1 of 1 |
| APPLICATION NO. | : 10/396675 | |
| DATED | : November 8, 2005 | |
| INVENTOR(S) | : William C. Moyer | |

It is certified that error appears in the above-identified patent and that said Letters Patent is hereby corrected as shown below:

On the Title Page Item 54 and Col 1, Lines 1-3, the Patent Title:

Change "MULTIPROCESSOR SYSTEM HAVING A SHARED MAIN MEMORY ACCESSIBLE BY ALL PROCESSOR UNITS" to --MEMORY MANAGEMENT IN A DATA PROCESSING SYSTEM--

In Column 12, Line 5, Claim No. 37:

Change "36" to --35--

This certificate supersedes the Certificate of Correction issued May 13, 2008.

Signed and Sealed this

Third Day of June, 2008

JON W. DUDAS
*Director of the United States Patent and Trademark Office*